Aug. 25, 1925.                    K. ERICKSON                    1,550,894
                                  NAIL PULLER
                               Filed Jan. 29, 1925

INVENTOR:
Knuth Erickson
BY Nissen & Crane
ATTYS.

Patented Aug. 25, 1925.

1,550,894

UNITED STATES PATENT OFFICE.

KNUTH ERICKSON, OF CHICAGO, ILLINOIS.

NAIL PULLER.

Application filed January 29, 1925. Serial No. 5,458.

*To all whom it may concern:*

Be it known that I, KNUTH ERICKSON, a subject of the King of Sweden, residing at Chicago, in the county of Cook and State of Illinois, have invented certain new and useful Improvements in Nail Pullers, of which the following is a specification.

My invention relates to a device for pulling nails, tacks or other fasteners, the construction being such that the device may be readily carried on other tools such as putty knives, scrapers and the like, and has for one of its objects the provision of simple and effective means for quickly and efficiently removing such fasteners.

A further object of the invention is the provision of means for rendering one tool capable of performing the functions of two.

A still further object of the invention is the provision of a nail pulling device to conform with the handle of a tool and eliminate dangerous protruding elements.

Another object of the invention is to provide a nail pulling device that may be safely employed on tools used for purposes requiring the removal of nails.

Other objects will appear hereinafter, the novel features and combinations being set forth in the appended claims.

Figure 1:
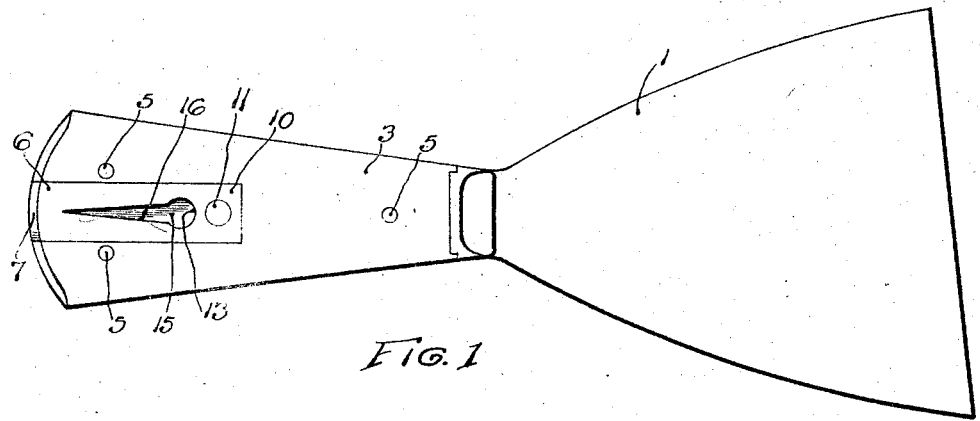
Fig. 1 is a top plan view of a painter's scraper embodying one form of my invention.
Figure 2:
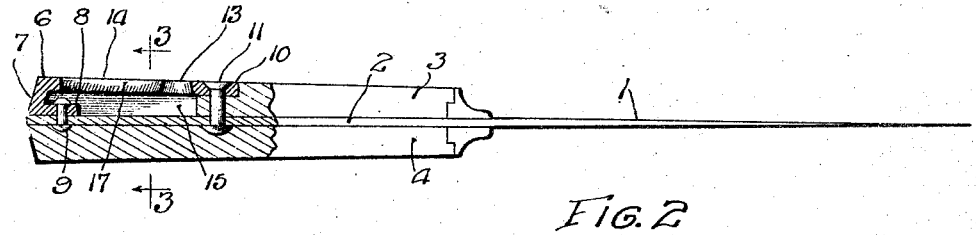
Fig. 2 is a side elevational view of a scraper showing a portion of the handle thereof cut away and a longitudinal sectional view of the nail pulling device.

Referring more particularly to the drawings, Figs. 1 and 2 illustrate a scraper comprising a sheet metal blade 1 having a metal handle portion 2 made integral therewith. The handle portion 2 of the scraper is covered with upper and lower grip elements 3 and 4 respectively made of wood, fiber or any other suitable material. These grip elements are secured, one on each side of the metal handle portion 2 by rivets 5 which extend through each grip element 3 and 4 and through the metal handle portion 2, the ends of the rivets 5 being peened over and made flush with the outer surfaces of the grip elements. The grip elements are provided to enlarge the handle of the tool and make it comfortable to use.

Figure 3:
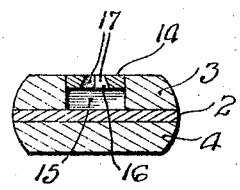
Fig. 3 is a sectional view taken on line 3—3 of Fig. 2, looking in the direction of the arrows.

A nail pulling device 6 is shown in Figs. 1, 2 and 3 to be inlaid in the tool handle so that all surfaces of the device are flush with the surfaces of said handle. The nail pulling device 6 comprising a narrow strip of metal is disposed in an opening 15 in the grip element 3 near the end thereof, the longitudinal center line of the slot being in registration with the longitudinal center line of the tool handle. It will be seen in Figs. 2 and 4 that the end 7 of the nail pulling device 6 is offset to engage the surface of the metal handle portion 2 and that the extreme end 8 of the narrow metal strip extends inwardly in contact with the metal handle portion 2. A rivet 9 secures the end 8 of the narrow metal strip to the handle portion 2 near the extreme end of the handle. The forward end portion 10 of the nail pulling device 6 is inlaid in the grip element 3 a distance equal to the thickness of the narrow metal strip and a rivet 11 secures the forward end portion 10 in place. It will be seen in Figs. 1 and 2 that the rivet 11 passes through the nail pulling device, the grip element 3 and the metal handle portion 2, one end of said rivet engaging the surface of the metal handle portion 2. The outer end of the rivet 11 is peened over and disposed in a countersunk hole or opening 12.

A circular hole or opening 13, large enough to accommodate the head of a nail, is provided in the uppermost surface 14 of the nail puller 6, and this opening is extended towards the end of the handle in the form of a tapered slot 16. It should be understood that the opening 15 provides a space under the narrow metal strip to permit passage of the head of a nail towards the end of the handle. When the head of the nail is inserted in the opening 13 the tool may be moved so as to cause the shank of the nail to be gripped by the sides of the slot 16 and the head of the nail to be locked in the opening 15. As shown in Fig. 3, the edges 17 of the slot 16 are beveled so as to provide a sharp edge that will grip the shank of the nail. Thus a nail is secured at the shank portion thereof and the head of the nail is also locked in the opening 15.

Figure 4:
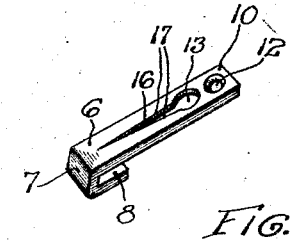
Fig. 4 is a perspective view of the nail engaging portion of the device removed from the tool handle.

The form of the invention shown in Fig. 4 could be applied to a completed tool, or it could conveniently be installed during the process of manufacture.

Figure 5:
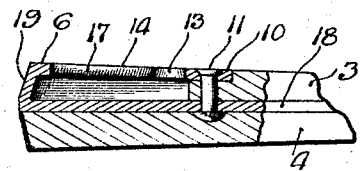
Fig. 5 is a sectional view of a portion of a tool handle embodying a modified form of my invention.

In Fig. 5 a modified construction of the device is shown. It will be seen that the metal handle portion 18 is reduced in width and extended at its end to form a comparatively narrow integral strip of metal 19. This strip of metal extends outwardly and backwardly and is disposed parallel to the metal handle portion 18 so as to cover the opening 15 provided in the grip element 3. This construction eliminates one rivet and provides a device having sufficient strength for the purpose intended. The forward end of the nail puller is secured to the metal handle portion 19 by a rivet 11 in the manner set forth in the description of Figs. 1 and 2. The nail gripping opening is also similar to the opening described in connection with Figs. 1 and 2.

Obviously those skilled in the art may make various changes in the details and arrangement of parts without departing from the spirit and scope of the invention defined by the claims hereto appended, and it is therefore desired not to be restricted to the precise construction herein disclosed.

Having thus fully described and shown an embodiment of the invention, what is desired to be secured by Letters Patent of the United States, is:

1. The combination of a tool handle comprising a metal reinforcing member, covering members secured one on each side of said reinforcing member, and means extending from and supported by the end portion of the reinforcing member and inlaid in one of said covering elements for pulling nails.

2. The combination of a tool handle comprising a metal reinforcing member, cover plates secured one on each side of said reinforcing member, and a nail puller made integral at one end with said reinforcing member and secured at the other to one of said cover plates and said reinforcing member.

3. The combination with a tool handle, of a reinforcing member for said handle, a cover plate for said reinforcing member, a nail puller supported by the end portion of said reinforcing member and disposed upwardly and backwardly therefrom in a recess in said cover plate, and means on said nail puller for gripping the shank of a nail.

4. The combination with a tool handle, of a reinforcing member for said handle comprising an extension of the blade of said tool, cover plates secured to the extended portion of said blade, means for pulling nails disposed in one of said cover plates comprising a strip of metal having an elongated tapered opening therein with the constricted portion directed towards the rear end of the handle, and means for securing said nail pulling means to said reinforcing member.

5. The combination with a tool handle comprising a metal reinforcing member, and an extension on the rear end of said reinforcing member made integral therewith and disposed outwardly and backwardly to form a closure for a recess in said tool handle, there being an opening at the forward end of said extension having a restricted V-shaped slot connected therewith, said enlarged opening being large enough to permit the passage of a nail head therethrough and said restricted portion being small enough to retain the entire head of said nail in said recess.

6. The combination with a tool, of a tool handle comprising a metal reinforcing member made integral with said tool, cover plates for said reinforcing member, there being a recess in one of said cover plates near the end thereof, an extension on said metal reinforcement made integral therewith and disposed to form a closure for said recess, and means securing the free end of said extension to said recessed cover plate, and a slot in said extension for pulling nails.

7. The combination with a tool, of a tool handle having a recess therein, a metal reenforcement disposed between sections of said handle, and an extension on said reenforcement having a recess therein for pulling nails disposed upwardly and backwardly to cover said recess.

8. A combination of a tool handle having a recess therein, and a metal reenforcement member having a slot therein for pulling nails disposed upwardly and backwardly for covering said recess.

9. The combination with a tool handle comprising a metal reenforcing member, a covering member secured to one side of said reenforcing member, an extension having a slot therein for pulling nails secured at one end directly to the end of said metal reenforcing member and at the other end to the intermediate portion of said reenforcing member.

10. The combination with a tool, of a tool handle having a recess therein, a metal reenforcing member disposed between sections of said handle and an extension made integral with said reenforcing member and protruding from the end thereof, said extension having a slot therein for gripping nails and being disposed upwardly and backwardly to cover said recess.

In testimony whereof I have signed my name to this specification on this 27th day of January, A. D. 1925.

KNUTH ERICKSON.